Oct. 11, 1949.　　　　M. L. McCONNELL　　　　2,484,180

THERMOSTAT VALVE

Filed May 28, 1946

MAX L. McCONNELL, Inventor

By *McMorrow, Berman & Davidson*
Attorneys

Patented Oct. 11, 1949

2,484,180

UNITED STATES PATENT OFFICE 2,484,180

THERMOSTAT VALVE

Max L. McConnell, Portland, Oreg.

Application May 28, 1946, Serial No. 672,848

2 Claims. (Cl. 226—12)

My invention relates to valves and more particularly to mixing valves for hot and cold fluids, gas and the like.

The object of my invention is to provide a mixing valve adapted to be connected with a source of hot fluid and a source of cold fluid and having a thermostat therein for adjusting the flow of said fluids into the mixing valve to control the temperature of the mixture leaving said valve.

Other objects of my invention may appear in the following specification describing my invention with reference to the accompanying drawing illustrating a preferred embodiment of my invention.

It is however, to be understood that my invention is not to be limited and restricted to the exact construction and combination of parts described in the specification and shown in the drawing, but that such changes and modifications can be made which fall within the scope of the claims appended hereto.

Figure 1:
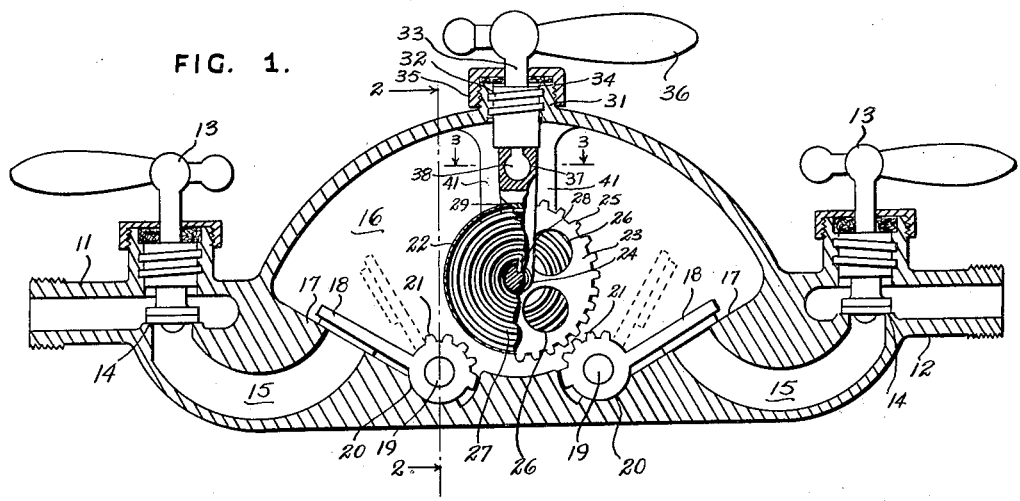
Figure 1 is a longitudinal, vertical, sectional view through the mixing valve according to my invention.
Figure 2:
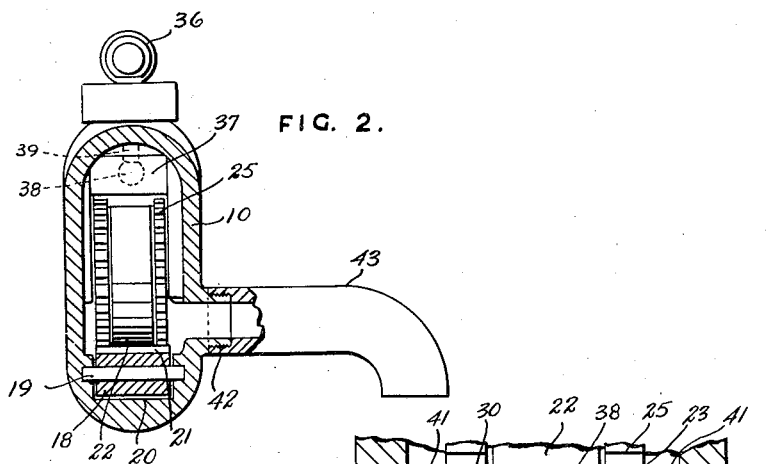
Figure 2 is a sectional view taken on line 2—2 in Figure 1.
Figure 3:
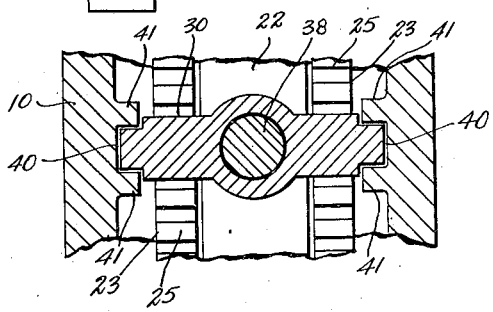
Figure 3 is a fragmentary enlarged horizontal sectional view taken on line 3—3 in Figure 1.

Referring now in detail to the drawing the mixing valve according to my invention has a housing 10. On each end this housing is provided with an inlet 11 and 12 respectively, the inlet 11 being adapted to be connected with a source of hot fluid and the inlet 12 being adapted to be connected with a source of cold fluid (these sources are not shown). On each inlet 11 and 12 a control valve 13 is provided, which may be of any preferred, conventional type. For each valve 13 a valve seat 14 is arranged inside the housing 10 and from each valve seat 14 a conduit 15 leads into the main chamber 16 in the housing 10. The walls 17 of the main chamber 16 through which the conduits 15 enter said chamber are formed into valve seats for check valves 18, which are pivotally mounted on shafts 19, rigidly arranged in the walls of the housing 10. The rear end of the stem of each check valve 18 is disk-shaped as shown at 20 and the inner and upper segment, occupying approximately one fourth of the circumference of this disk is provided with gear teeth 21.

A hollow cylinder 22 has a cover 23 rigidly mounted on each of its ends and a shaft 24 extends centrally through these covers. The cylinder 22 can rotate freely about the shaft 24.

The covers 23 have gear teeth 25 on their circumferences extending beyond the circumference of the cylinder 22 and adapted to mesh with the gear teeth 21 on the end disks of the check valves 18. Each cover 23 is provided with a plurality of holes 26 therein.

A spiral thermostat 27 is located inside of the cylinder 22. The inner end of this thermostat is fastened onto the shaft 24 as shown at 28 in Figure 1 and the outer end of the thermostat is fastened onto the inner surface of the cylinder 22 as shown at 29 in Figure 1.

The ends of the shaft 24 are rigidly imbedded in the arms of a yoke 30.

In the middle of the top wall a sleeve 31 extends upwardly from said wall. It is provided with an inside square thread into which the threaded stem 32 of a control mechanism for the thermostat is threadedly inserted.

This stem has an upwardly extending reduced portion 33 thereon forming a stop shoulder 34 with said stem. The sleeve 31 has an outside thread thereon and a threaded cap 35 is adapted to be secured onto said sleeve. The cap has a hole in its center and the reduced stem portion extends through this hole. A handle 36 is removably attached to the outer end of the reduced stem portion 33.

A socket 37 is formed on top of the yoke 30 and a ball 38 on a downwardly extending neck 39 which is formed on the bottom of the stem 32 fits rotatably in the socket 37.

The sides of the yoke 30 are slidably arranged in grooves 40 formed on the front and rear wall of the housing 10 by inwardly protruding projections 41.

By manipulating the handle 36 the cylinder 22 containing the thermostat 27 can be moved upwardly and downwardly to disengage or engage the gear teeth 25 on the cylinder covers with the gear teeth 21 on the end disks 20 of the check valves 18.

On the front wall of the housing 10 an outwardly threaded outlet sleeve 42 is arranged and a faucet 43 is removably attached thereto.

When the mixing valve is to be used the hot and cold inlet valves 13 are opened. The fluid entering therethrough into the housing 10 flows through the openings 26 into the cylinder 22 and comes into contact with the thermostat 27. During these proceedings the control-mechanism is in the position shown in Figure 1, that means the teeth 21 and 25 of the disks and the cover gears are disengaged. The check valves 18 are opened by the pressure under which the hot and cold fluid is propelled. This pressure should be alike on both fluids.

The temperature of the mixed fluid entering the cylinder will actuate the thermostat, which in turn will rotate the cylinder. When the mixed fluid has the desired temperature, the control mechanism is lowered so that the cover gear teeth 25 and disk teeth 21 will get into mesh with each other. The thermostat will regulate the setting of the check valves, so that the mixed fluid will remain at the desired temperature. To maintain a steady flow of fluids valves 13 are then opened fully.

The inlet valves may be located at any desired distance from the mixing valve, and so long as an ample supply of hot and cold fluid is provided, the desired temperature is maintained in the mixed fluid, so that this valve is especially useful for maintaining an even temperature in shower baths, when other faucets on the same pipe line are opened.

The outlet faucet can be removed and a pipeline attached in its place, which could be used for a number of purposes, for instance to supply warm water for washing windows, automobiles, etc.

Having described my invention, I claim as new and desire to secure by Letters Patent:

1. A mixing valve having a housing, separate inlets for hot and cold fluid formed in said housing and an outlet for mixed fluid formed in said housing, a coiled thermostat arranged in said housing and including inner and outer ends, means controlled by said thermostat for regulating the inflow of hot and cold fluid into said housing, said means comprising separate check valves for said hot and cold fluid inlets, means mounting said check valves in said housing for pivotal movement in opening and closing directions, a shaft fixed in said housing and extending transversely thereof axially of said thermostat, an open cylinder freely rotatably mounted on said shaft and concentrically disposed about said thermostat, the inner end of said thermostat being fastened to said shaft, the outer end of said thermostat being fastened to said cylinder, whereby to rotate said cylinder in opposite directions on said shaft upon expansion and contraction of said thermostat, gear teeth fixed on said cylinder concentrically thereof, gear teeth operatively connected to each of said check valves, said gear teeth on said cylinder being adapted to mesh with said teeth on said valves, whereby to actuate the latter upon rotation of said cylinder, said valves being arranged so that rotation of said cylinder in either direction is operative to move one valve in an opening direction and the other valve in a closing direction, means mounting said cylinder for linear movement in said housing into and out of mesh with said gear teeth of said valves, and means for moving said cylinder linearly in meshing and unmeshing directions.

2. A mixing valve having a housing, separate inlets for hot and cold fluid formed in said housing and an outlet for mixed fluid formed in said housing, a coiled thermostat arranged in said housing and including inner and outer ends, means controlled by said thermostat for regulating the inflow of hot and cold fluid into said housing, said means comprising separate check valves for said hot and cold fluid inlets, means mounting said check valves in said housing for pivotal movement in opening and closing directions, a shaft fixed in said housing and extending transversely thereof axially of said thermostat, an open cylinder freely rotatably mounted on said shaft and concentrically disposed about said thermostat, the inner end of said thermostat being fastened to said shaft, the outer end of said thermostat being fastened to said cylinder, whereby to rotate said cylinder in opposite directions on said shaft upon expansion and contraction of said thermostat, gear teeth fixed on said cylinder concentrically thereof, gear teeth operatively connected to each of said check valves, said gear teeth on said cylinder being adapted to mesh with said teeth on said valves, whereby to actuate the latter upon rotation of said cylinder, said valves being arranged so that rotation of said cylinder in either direction is operative to move one valve in an opening direction and the other valve in a closing direction, means mounting said cylinder for linear movement in said housing into and out of mesh with said gear teeth of said valves, said last means comprising a yoke including a stem and parallel legs, said shaft extending across said legs and being fixed thereto, said housing being formed with opposed grooves slidably receiving said legs, and means engaging said stem of said yoke for moving said yoke and cylinder linearly of said grooves toward and away from said gear teeth of said check valves.

MAX L. McCONNELL.

REFERENCES CITED

The following references are of record in the file of this patent:

UNITED STATES PATENTS

| Number | Name | Date |
|---|---|---|
| 1,024,729 | Lawler | Apr. 30, 1912 |
| 2,122,600 | Young | July 5, 1938 |
| 2,332,995 | Eaton | Oct. 26, 1943 |